United States Patent [19]

Lindholm

[11] 4,413,588
[45] Nov. 8, 1983

[54] ANIMAL RESTRAINT COLLAR

[76] Inventor: Donald W. Lindholm, 15368 Betty Ann La., Oak Forest, Ill. 60452

[21] Appl. No.: 389,382

[22] Filed: Jun. 17, 1982

[51] Int. Cl.³ .................... A01K 15/04; A01K 27/00
[52] U.S. Cl. ................................................. 119/106
[58] Field of Search ........................... 119/96, 106, 15

[56] References Cited

U.S. PATENT DOCUMENTS

| 2,956,542 | 10/1960 | Mueller | 119/106 |
| 3,036,554 | 5/1962 | Johnson | 119/96 |
| 3,540,417 | 11/1970 | Reed | 119/15 X |
| 3,999,521 | 12/1976 | Puiello | 119/96 |
| 4,047,505 | 9/1977 | McAndless | 119/106 |

FOREIGN PATENT DOCUMENTS 876763 9/1961 United Kingdom ................ 119/15

Primary Examiner—Robert P. Swiatek
Attorney, Agent, or Firm—Hill, Van Santen, Steadman & Simpson

[57] ABSTRACT

An annular collar for surrounding the neck of an animal to project radially outward a sufficient distance to restrain the animal against escaping under or through fence enclosures, for glowing or reflecting light in the dark, and for preventing scratching of the animal's ears, is formed from complementary flat rigid U-shaped mats of plastic material or the like, a pivot joining a leg of each mat in overlapped relation accommodating swinging of the mats from a closed annular position with the other legs overlapped to an open position with these other legs spaced apart and with fasteners on these other legs to hold them in select overlapped positions for controlling the size of the collar. The pivoted together overlapped leg portions have a plurality of pivot receiving holes to vary the extent of overlap to increase the size range of the collar. The other free ends of the mats preferably have pockets containing "Velcro" strips to interlock at selected positions for also controlling the size of the collar. The mats have semi-circular inner and outer peripheries with legs projecting beyond the diameter of the semi-circle which are shaped to lie within the complete annulus of the collar in its many adjustable size positions to eliminate projecting ears or tabs beyond the annulus of the collar in its closed condition. The bottoms of the "Velcro" receiving pockets are flexible to facilitate pressing of the "Velcro" strips into locked condition and to assist peeling the strips apart.

12 Claims, 8 Drawing Figures

ANIMAL RESTRAINT COLLAR

FIELD OF THE INVENTION

This invention relates to the art of restraint collars for animals, and particularly deals with a radially extending collar composed of pivoted together arcuate mats having free ends swingable from an overlapped closed condition to a separated spaced apart condition for easy application of the collar around the neck of the animal.

BACKGROUND OF THE INVENTION

Animals, especially dogs, attempt to escape from fenced enclosures by digging under the fence, and by squeezing through crevices in the enclosure. Upon escape from the fenced enclosure, the dog is exposed to traffic, and frequently provides an unseen traffic hazard and becomes the victim of an accident. It would be an improvement in the art to provide an animal collar, adjustable through a wide range of sizes, which is easily applied to and removed from the neck of an animal such as a dog, and when applied will extend completely around and project radially from the neck a sufficient distance to restrain the animal against escape from a fenced enclosure without, however, interfering with the freedom of the animal within the enclosure.

SUMMARY OF THIS INVENTION

According to this invention, there is provided an animal collar which is light in weight, easily applied to and removed from the neck of an animal, will not interfere with free movement of the animal, but will project radially from the animal's neck a sufficient distance to prevent escape of the animal from a fenced enclosure. The collars of this invention are adjustable through a wide size range and are conveniently formed from a pair of complementary U-shaped rigid mats pivoted together to provide free ends which are spread apart to accommodate easy placing of the collar around the animal's neck and are then swingable into closed overlapped position to form a complete annulus projecting radially from the animal's neck a sufficient distance to restrain the animal against escape from a fenced enclosure. The pivot connection between the pair of mats is adjustable as is the overlapped position of the free ends of the mats so that a wide range of collar sizes is available to accommodate animals of different sizes and growth of the animal. The mats are preferably formed of luminous or light reflective plastics material, are rather thin but rigid, and have a width sufficient to provide the desired radial restraint.

For example, dog restraint collars of this invention may be composed of two identical rigid plastics material mats having a width of 2½ to 3 inches and a thickness of ⅛ to ¼ inch. High density polyethylene, rigid polyvinyl, and the like plastics materials are suitable for constructing the mats. The mats are shaped to provide circular collars variable from a large size outside diameter of 10 to 11 inches and an inside diameter of 7 to 8 inches down to a small size condition where the outer diameter is 5 or 6 inches, and the inner diameter diameter is 2 to 3 inches. These size variations are accommodated by a plurality of pivot holes spaced apart about ¾ inch for the pivot pin and by elongated "Velcro" strips about 3½ inches long and 1 inch wide, which can mate at various positions along their lengths, thereby varying the overlap of the mats. A size range accommodating a small dog or puppy and a larger or full grown dog is easily provided.

It is than a feature of the invention to provide a collar for restraining animals which is light in weight, easily applied and removed, comfortable to the animal, and projecting from the animal's neck just sufficiently to prevent or discourage the animal from digging under or squeezing through a fence.

Another important feature of the invention is the provision of an annular radially extending animal restraint collar adjustable through a wide range of sizes to comfortably fit the necks of animals of different sizes.

A specific feature is the provision of an annular radially extending animal restraint collar composed of a pair of U-shaped mats swingably connected at one end and releasably connected at the other end for easy application to and removal from the neck of an animal.

An object of the invention is to provide a lightweight, comfortable, animal restraint collar extending radially from the neck of an animal and swingable between opened and closed positions for ease in application and removal from an animal's neck.

A specific object of the invention is to provide a dog restraint collar composed of a pair of complementary U-shaped mats pivoted together at one end and releasably locked in overlapped position at the other end to swing from an open position which is easily applied around the dog's neck and locked in closed position to form a complete annulus around the dog's neck which projects radially for a sufficient distance to prevent the dog from digging under or squeezing through a fence.

Another important object of this invention is to provide an easily applied and removed, comfortable, lightweight, annular dog collar restraining the dog within a fenced area without interfering with free movement of the dog within the area and being visible in the dark to protect the dog against traffic accidents.

Other and further objects and features of this invention will be apparent to those skilled in this art from the following detailed description of the annexed sheet of drawings which, by way of a preferred example, illustrates two embodiments of the invention.

ON THE DRAWINGS

BRIEF DESCRIPTION OF THE PREFERRED EMBODIMENT

Figure 1:
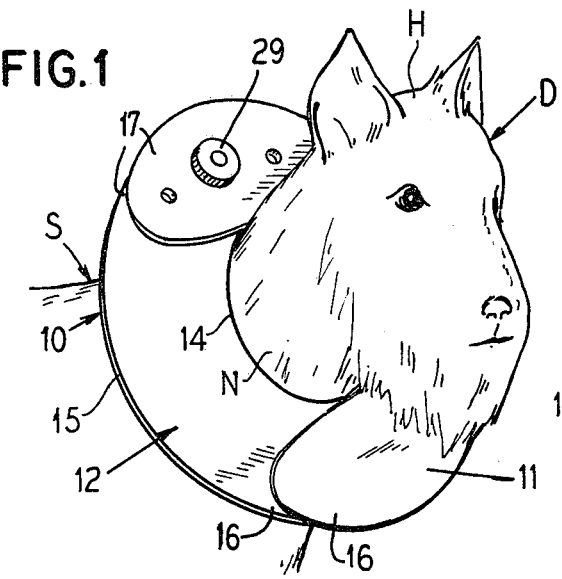
FIG. 1 is a fragmentary perspective view showing the collar of this invention in position around a dog's neck.

The collar 10 of FIGS. 1 to 4, as illustrated in FIG. 1, in position around the neck N of a dog D and closed to snugly engage the neck so that it cannot slip over the head H of the dog or retract over the shoulder S of the dog.

The collar 10 is composed of two U-shaped segments or mats 11 and 12. The mats 11 and 12 may be identical to complement each other in forming a true circular annulus when their ends are overlapped. For this purpose, each mat, such as the illustrated mat 11 in FIG. 7 has a true semi-circular portion 13 extending from a diameter line D through the center C with a first radius R struck from this center C defining the small semi-circular inner periphery 14 and a larger radius R1 generating the larger outer periphery 15. Beyond the diameter line D, the mat 11 has extending end portions or legs 16 and 17 with outer peripheries 18 and 19 generated from focal points F of an ellipse having a major axis A spaced inwardly from the diameter line D. These elliptical peripheries 18 and 19 merge into semi-circular free ends 20 and 21 which in turn are blended into the inner periphery 14 along substantially straight lines 22 and 23.

The leg 17 has a first aperture 24 on the diameter line D midway between the inner periphery 14 and the outer periphery 15 at a distance from the center C designated by the radius R2.

A second outer aperture 25 spaced closer to the free end 21 of the leg 17 is positioned closer to the inner periphery 23 of the leg 17 and thus spaced a shorter distance from the center C as designated by the radius R3. A third aperture 26 is provided through the circular arc portion 13 below the diameter D and closer to the outer periphery 19, thereby being spaced from the center C a greater distance than the aperture 24 as shown by the radius line R4. The apertures 24–26 are thus centered on an inclined axis A1, converging toward the inner portion of the rounded free end 21 and are equally spaced on this axis.

Figure 7:
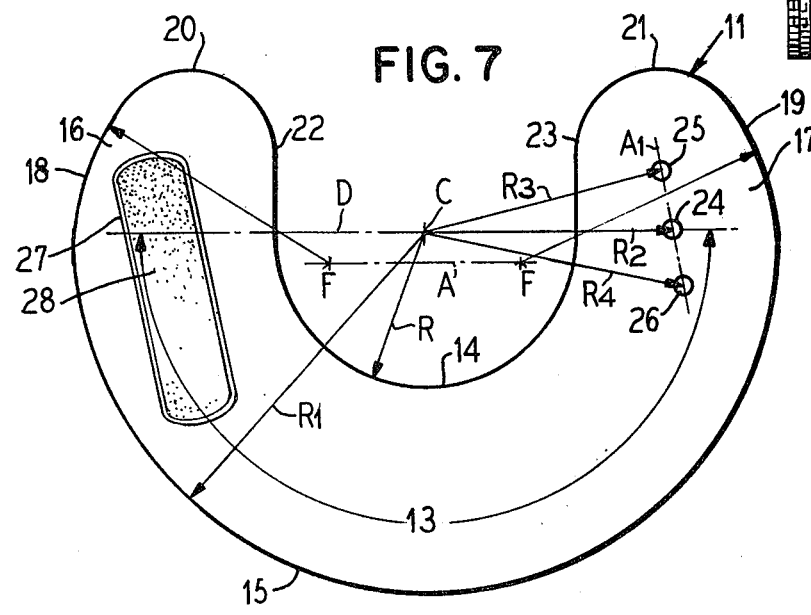
FIG. 7 is a plan view of a collar segment or mat showing the development of its shape and the positioning of the alternate pivot holes.

The purpose of the configuration of FIG. 7 is to provide U-shaped mats or segments 11 and 12 with semicircular bight portions which have end portions or legs that can overlap through a wide range of positions to vary the size of the collar without exposing end tabs or ears beyond the outer periphery of the collar and without substantially changing the circular annular shape of the closed collar.

As shown in FIGS. 1 to 4, the leg 16 of the mat 11 overlaps the leg 16 of the mat 12 while the leg 17 of the mat 11 overlaps the leg 17 of the mat 12 in the closed position of the collar. The closed collar then has substantially complete inner circular periphery 14 snugly embracing the dog's neck N and a substantially complete circular outer periphery 15 spaced outwardly from the dog's neck a sufficent distance to afford a wide radial face serving to restrain the dog.

The legs 16 have pockets 27 intermediate their inner and outer peripheries extending for a substantial distance along the length and into the true circular portion of the mat. "Velcro" strips 28 are cemented in these pockets and have their interlocking fibers projecting therefrom.

Figure 2:
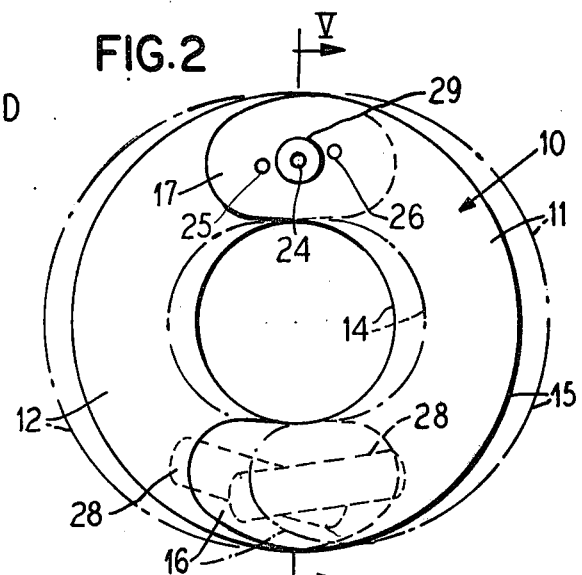
FIG. 2 is a plan view of the collar of this invention in closed position and illustrating in dotted lines expansion of the collar to a large position.

A pivot pin 29 has a shank 29a (FIG. 5) extending through a selected pair of holes in the overlapped ends 17 of the mats 11 and 12 and a knurled head 29b overlying the top mat 11 while a similar knurled nut 30 threaded on the shank 29a underlies the mat 12. This pivot pin 29 can thus be easily removed and inserted through any selected pair of registering holes 24–26 to vary the extent of overlap of the ends 17 of the two mats 11 and 12. Thus, for example, when the pin is inserted into the middle holes 24 of the mats 11 and 12 as shown in FIG. 2, the mats can be swung from the position shown in solid lines to an extended size position shown in dotted lines with the free end legs 16 being overlapped accordingly. In the expanded dotted line condition, the collar will still retain its substantially full circular shape being only slightly elliptical but without projecting the ends 16 and 17 beyond the outer periphery 15 or within the inner periphery 14.

Figure 4:
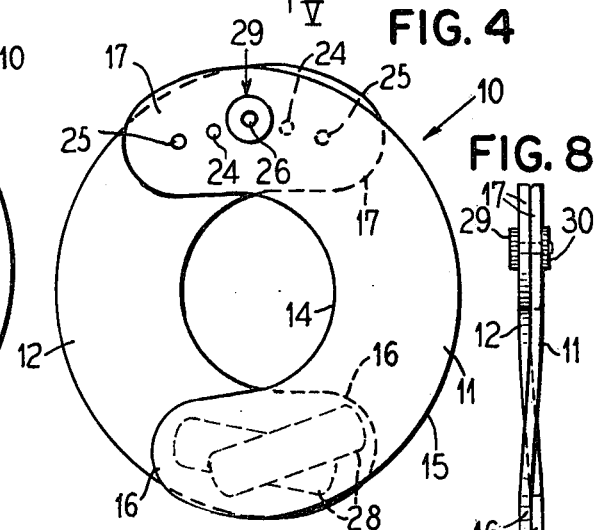
FIG. 4 is a plan view similar to FIG. 2 but showing a minimum size condition achieved by shifting the pivot pin to other holes in the mats or segments of the collar and overlapping the free ends of the mats without projecting their ends beyond the outer circumference of the collar annulus.

If, as shown in FIG. 4, the pin 29 is inserted through the innermost holes 26 the mats can be swung together to further overlap the ends 16 without exposing the free ends of the legs beyond the periphery of the collar and still maintain a substantially full circular shape for the closed collar.

It will be understood, of course, that any combination of the holes 24–26 can be placed in registration to vary the effective size of the collar, and that a wide range of overlap of the free ends 16 of the collar will further vary its effective size.

Figure 3:
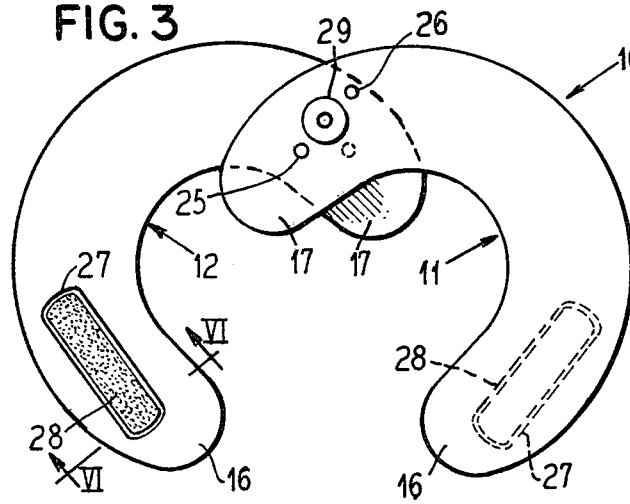
FIG. 3 is a view similar to FIG. 2 but showing the collar in opened position.

As shown in FIG. 3, the mats 11 and 12 can be swung apart on the pivot 29 to open up a wide gap between the free ends 16 so that the collar is easily applied around the dog's neck and then swung to its closed position of FIG. 1.

Figures 5, 6:
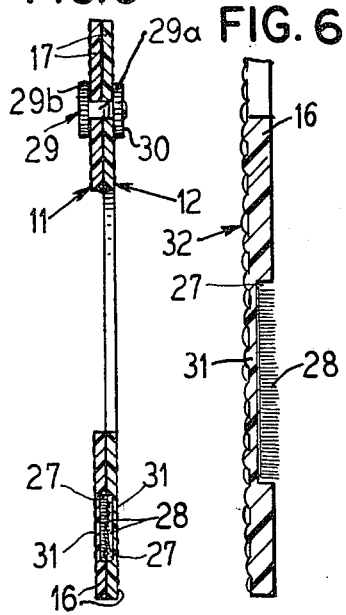
FIG. 5 is a cross-sectional view along the line V—V of FIG. 2.
FIG. 6 is an enlarged fragmentary view along the line VI—VI of FIG. 3.

As shown in FIGS. 5 and 6, the bottoms 31 of the pockets 27 are relatively thin and flexible so that they may be easily depressed to squeeze together the interlocking "Velcro" tapes 28. These flexible bottoms also accommodate ease in peeling the tapes apart since they will flex to roll the tapes as they are pulled apart.

The "Velcro" tapes 29, as illustrated in FIGS. 2 and 4 overlap in angled or crossed relation in the adjusted size positions of the mats 11 and 12. This angular relation of the elongated tapes also provides for ease in pulling the tapes apart without pulling them out of their pockets.

As shown in FIG. 6, the front, or both faces of the collar 10 can be provided with a light reflecting beaded surface 32 of a commercial type such as "Scotch-Lite". Also, the collar segments can be composed of a luminescent type plastic material to glow in the dark.

Figure 8:
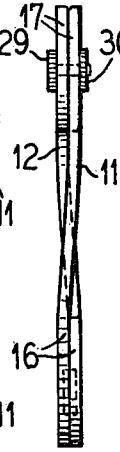
FIG. 8 is an end elevational view of a modified collar of this invention.

In the modification of FIG. 8, the mats 11 and 12 are crossed over, being underlapped at their pivoted ends 17. This alternate positioning of the ends 17 of the mats will bias the free ends 16 against each other when they are overlapped. The cross over with an underlap at 17 and an overlap at 16 is accommodated by a degree of resilience in the rigid mats which holds their lapped ends tightly together.

From the above descriptions, it will therefore be understood that this invention provides an annular animal collar composed of two lapped U-shaped segments or mats which are pinned together for selected degrees of lap at one end and are releasably secured together for selected degrees of lap at the other end to vary the size of a radially extending annulus on an animal's neck without substantially departing from the true circular shape.

It will also be understood that the release lock provided by "Velcro" tapes could also be provided by other tapes or fasteners including pressure sensitive adhesive or the like fasteners.

It will be apparent to those skilled in the art that many modifications and variations may be effected without departing from the spirit and scope of the novel concepts of the present invention.

I claim as my invention:

1. An annular radial animal restraint collar adjustable to snugly fit a wide size range of animal necks to be held on the neck between the animal's head and shoulders and project radially for restraining the animal against digging under or squeezing through fences which comprises a pair of rigid flat U-shaped mats each having a bight portion and a pair of legs extending from the bight portion having curved outer peripheries, one leg of each mat having a plurality of holes spaced along the length thereof, the other leg of each mat having a strip of fibers secured thereon with the fibers of the strips interlocking when the strips are pressed together, the legs containing the holes being overlapped with a selected hole of one leg aligned with a selected hole of the other leg, a removable pivot pin seated in the aligned holes accommodating swinging of the mats from a closed position with fiber strips overlapped in selected positions to an open position with the strip carrying legs spaced apart opening a gap facilitating easy application and removal of the collar from the animal's neck, the selected alignment of the holes, and the selected overlapping of the fiber strips varying the closed size of the collar without projecting the curved outer peripheries of the legs substantially beyond the outer peripheries of the bight portions.

2. The collar of claim 1 wherein the mats are identical.

3. The collar of claim 1 wherein the closed collar is circular and varies from a large size outside diameter of 10 to 11 inches and an inside diameter of 7 to 8 inches down to a small size having an outer diameter of 5 to 6 inches and an inner diameter of 2 to 3 inches.

4. The collar of claim 1 wherein the strips overlap at an angle relative to the lengths thereof to facilitate separation of the interlocked fibers.

5. The collar of claim 1 wherein the strips are seated in elongated pockets with flexible bottoms to facilitate pressing the strips together into interlocking relation.

6. The collar of claim 1 wherein the legs of the mats are crossed over to overlap on opposite faces.

7. An annular radial dog restraint collar adjustable to fit a wide range of neck sizes to snugly surround the neck and project radially outward therefrom for restraining the dog against digging under or squeezing through a fence which comprises a pair of rigid flat U-shaped jaws each having a fragmental circular bight portion and a pair of legs extending therefrom having elliptical outer peripheries, a removable pivot connecting a first leg of each jaw in overlapped relation, interlocking fasteners on the second leg of each jaw releasably securing the second legs in overlapped position, said pivot and said fasteners accommodating swinging of the jaws from a closed annular position to an open position with a gap between the second legs to facilitate easy application of the collar on the neck of a dog, a plurality of pivot receiving holes in the first leg of each jaw positioned to vary the amount of overlap thereof, said fasteners on the second leg of each jaw having a plurality of locking positions cooperating with the plurality of holes for the pivot to widely vary the amount of overlapping of the jaws while maintaining a generally circular shape for the closed collar without projecting the elliptical outer peripheries of the legs substantially beyond the circular shape.

8. The collar of claim 7 wherein the bight of each jaw is semi-circular with the inner and outer peripheries thereof struck from radii on the same center.

9. The collar of claim 8 wherein the holes of each jaw are variably spaced from the center of the bight portion.

10. The collar of claim 7 wherein each jaw has a leg with a plurality of spaced holes along the length thereof and a second leg with a strip of interlocking fiber material along the length thereof.

11. The collar of claim 7 wherein the pivot is a threaded bolt with an easily removable nut threaded thereon.

12. The collar of claim 7 wherein the pivot is a bolt having a threaded shank and a knurled head and a knurled nut is threaded on the shank.

* * * * *